United States Patent
Arthur et al.

(10) Patent No.: US 10,317,886 B1
(45) Date of Patent: Jun. 11, 2019

(54) METHOD AND SYSTEM FOR AUTOMATED SHIM MANUFACTURING

(71) Applicant: SHIMTECH INDUSTRIES US, INC., Santa Clarita, CA (US)

(72) Inventors: Shane Edward Arthur, Kirkland, WA (US); Martin Guirguis, San Diego, CA (US); Dhananjay Vasa, San Diego, CA (US); Kyle Biondich, Seattle, WA (US)

(73) Assignee: Shimtech Industries US, Inc., Santa Clarita, CA (US)

( * ) Notice: Subject to any disclaimer, the term of this patent is extended or adjusted under 35 U.S.C. 154(b) by 0 days.

(21) Appl. No.: 15/966,729

(22) Filed: Apr. 30, 2018

(51) Int. Cl.
| | |
|---|---|
| *G06F 19/00* | (2018.01) |
| *G05B 19/418* | (2006.01) |
| *G01B 11/00* | (2006.01) |
| *B64F 5/10* | (2017.01) |
| *G01B 11/14* | (2006.01) |
| *B29L 31/30* | (2006.01) |

(52) U.S. Cl.
CPC ......... *G05B 19/41805* (2013.01); *B64F 5/10* (2017.01); *G01B 11/005* (2013.01); *G01B 11/14* (2013.01); *B23P 2700/01* (2013.01); *B29L 2031/3085* (2013.01)

(58) Field of Classification Search
CPC ..................................................... G06Q 10/06
USPC ........................................................ 700/95
See application file for complete search history.

(56) References Cited

U.S. PATENT DOCUMENTS

| | | | |
|---|---|---|---|
| 4,841,224 A * | 6/1989 | Chalupnik | G01B 7/14 324/609 |
| 4,848,137 A | 7/1989 | Turner et al. | |
| 7,607,614 B2 | 10/2009 | Rouyre | |
| 7,883,657 B2 | 2/2011 | Pridie | |
| 8,126,688 B2 | 2/2012 | Hollingshead et al. | |
| 8,479,394 B2 | 7/2013 | Glazebrook | |
| 8,621,819 B2 | 1/2014 | Kayani et al. | |
| 8,813,382 B1 | 8/2014 | Buttrick | |

(Continued)

FOREIGN PATENT DOCUMENTS

| | | |
|---|---|---|
| JP | 2014056560 A * | 3/2014 |
| WO | 2009/044362 A2 | 4/2009 |

OTHER PUBLICATIONS

Manning et al., "Filling the gap," http://www.capacitec.com/Content/Editor/File/AerospaceTestingIntn-IGapmanArticle.pdf, 2017, 1 page.

(Continued)

*Primary Examiner* — Suresh Suryawanshi
(74) *Attorney, Agent, or Firm* — Drinker Biddle & Reath LLP

(57) ABSTRACT

An autonomous shim fabrication system includes a gap data acquisition device that acquires gap data for a gap between mating surfaces of components that are to be assembled, a gap data conversion system that converts the gap data into three dimensional computer solid model data of the gap, a solid model data correction system that corrects the solid model data to generate corrected solid model data of the gap, and a solid model data conversion system that converts the corrected solid model data into a manufacturing sequence. When the manufacturing sequence is executed by a computer communicatively coupled to a manufacturing machine, the system controls the manufacturing machine to manufacture a shim corresponding to the gap.

28 Claims, 11 Drawing Sheets

(56) References Cited

U.S. PATENT DOCUMENTS

| | | | |
|---|---|---|---|
| 9,068,809 B1 | 6/2015 | Lagally et al. | |
| 9,429,935 B2 | 8/2016 | Boyl-Davis et al. | |
| 9,599,983 B2 | 3/2017 | Valenzuela et al. | |
| 9,652,583 B2 | 5/2017 | Doyle et al. | |
| 9,772,313 B2 | 9/2017 | Blom | |
| 2008/0110275 A1* | 5/2008 | Odendahl | G01B 7/14 73/780 |
| 2008/0256788 A1* | 10/2008 | Glazebrook | B23P 19/10 29/700 |
| 2015/0083692 A1* | 3/2015 | Bruck | B23K 26/34 219/76.14 |
| 2015/0294032 A1 | 10/2015 | Lagally et al. | |
| 2016/0221262 A1* | 8/2016 | Das | G03F 7/70416 |
| 2017/0132355 A1 | 5/2017 | Vasquez et al. | |
| 2017/0138385 A1 | 5/2017 | Clark et al. | |
| 2017/0210489 A1 | 7/2017 | Bode et al. | |
| 2017/0220021 A1 | 8/2017 | Bode et al. | |
| 2017/0327201 A1 | 11/2017 | Doyle et al. | |
| 2018/0067476 A1* | 3/2018 | Engelbart | B33Y 80/00 |

OTHER PUBLICATIONS

Wang et al., "Shimming design and optimal selection for non-uniform gaps in wing assembly," Assembly Automation, Emerald Group Publishing Limited, 2017, vol. 37(4), pp. 471-482; abstract only.

\* cited by examiner

METHOD AND SYSTEM FOR AUTOMATED SHIM MANUFACTURING

TECHNICAL FIELD

The present disclosure relates generally to methods and systems for manufacturing shims that are to be used in an assembly process, and preferably, to be used in the assembly of an aircraft.

BACKGROUND

The process of assembling an aircraft requires the use of many fillers, or shims, placed between parts that are to be assembled. The need for shims between assembled parts in aircraft assembly is particularly important given the relatively tight tolerances. For example, tolerances may often require that shims be used when a gap between assembled parts exceeds 0.005 inches. It is not uncommon for a typical commercial aircraft to require over 5,000 shims. In particular, the wing by itself may require over 3,000 shims.

Compounding the problem is the lengthy process required from the time a gap is determined and measured to the time the shim is finally manufactured and installed. Typically, two pieces are brought together as they would be during assembly. A mechanic would then take a series of measurements of the gap between the assembled parts, these measurements to be later used for the manufacture of a shim to fill the gap. Measurements could be taken, for example, using a handheld device with a capacitance gauge to detect the distance between the pieces to be assembled. An example of such a device is the GAPMAN device sold by Capacitec, Inc.

The mechanic would take a sufficient number of gap measurements, for example with the GAPMAN device, to create a grid of X-Y points with corresponding Z measurements (from the measuring device) corresponding to the shim thickness. A mechanic would typically record these XYZ measurements manually in either handwritten form or directly into a computer program, such as a Microsoft Excel spreadsheet. A single shim could require upwards of 200 hand-taken measurements. That number of measurements is multiplied by the total number of shims that are required, which as indicated above, is typically in the thousands.

At the conclusion of the process described above, there will be a significant amount of raw data in the form of XYZ measurements. However, this raw data by itself is not usable for ultimately creating the shim until it is converted into another format that could be understood by the shim manufacturing equipment. Therefore, a next step in the process is to take the gap measurement raw data and convert that data into a format compatible with a solid modeling program, such as Polyworks®.

A second technician in the process, skilled in the use of solid modeling software, would take the converted data and manipulate the resulting solid model as needed. For example, the conversion process from the raw data to the solid model data could result in the creation of outliers or anomalies or other problems in the data that are to be eliminated or otherwise resolved before a shim can be machined.

After the second technician has manipulated the solid model data to get it into shape for machining, a second data conversion is needed to generate the requisite data to manufacture the shim. For example, this third form of data could be in the form of machine code for a computer numerical control (CNC) machine. The CNC code is configured to instruct the machining of a workpiece in accordance with the geometry of the solid model data to finally manufacture the shim.

A third technician, skilled in the use of CNC machines (or other manufacturing methods), would be in charge of creating the machine code and in the setup of the manufacturing equipment and ultimate creation of the shim.

In the end, the above process—the taking of gap measurements, conversion into solid model data, manipulation of the solid model data, creation of machine code, and final manufacturing of the shim—could require more than 8 hours. Thus, the aircraft assembly process would be put on hold to accommodate the time required to create the needed shims, often requiring the assembly to be stopped until the following day.

SUMMARY

According to an embodiment, an autonomous shim fabrication system includes a gap data acquisition device that acquires gap data for a gap between mating surfaces of components that are to be assembled, a gap data conversion system that converts the gap data into three dimensional computer solid model data of the gap, a solid model data correction system that corrects the solid model data to generate corrected solid model data of the gap, and a solid model data conversion system that converts the corrected solid model data into a manufacturing program. When the manufacturing program is executed by a computer communicatively coupled to a manufacturing machine, the system controls the manufacturing machine to manufacture a shim corresponding to the gap.

According to another embodiment, a method of autonomously manufacturing a shim, includes acquiring gap data for a gap between mating surfaces of components that are to be assembled, converting the gap data into three dimensional computer solid model data of the gap, correcting the solid model data to generate corrected solid model data of the gap, converting the corrected solid model data into a manufacturing program, and controlling a manufacturing machine to manufacture a shim corresponding to the gap based on the manufacturing program when the manufacturing program is executed by a computer communicatively coupled to the manufacturing machine.

According to another embodiment, a tangible, non-transitory computer readable medium, storing machine readable instructions that, when executed by one or more processors, cause the one or more processors to acquire gap data for a gap between mating surfaces of components that are to be assembled, convert the gap data into three dimensional computer solid model data of the gap, correct the solid model data to generate corrected solid model data of the gap, convert the corrected solid model data into a manufacturing program, and control a manufacturing machine to manufacture a shim corresponding to the gap based on the manufacturing program.

BRIEF DESCRIPTION OF THE DRAWINGS

While the appended claims set forth the features of the present techniques with particularity, these techniques may be best understood from the following detailed description taken in conjunction with the accompanying drawings of which:

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Figure 1:
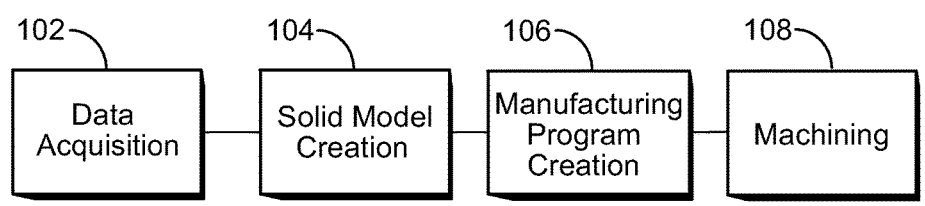
FIG. 1 is a block diagram of an automated shim fabrication method, according to an embodiment.

Turning to FIG. 1, in an embodiment, a method for automated shim manufacturing involves the following stages: a data acquisition stage 102, a solid model creation stage 104, a manufacturing program creation stage 106, and a machining stage 108. Each stage may involve one or more devices. According to an embodiment: (1) The data acquisition stage 102 involves the use of a gap measurement device (e.g., a CT scanner, a 3D imager, or a capacitance gauge) acquiring raw data regarding the dimensions of a gap between two or more parts. The raw data may, for example, be acquired in the form of a point cloud or acquired in some other form and then converted into a point cloud by one or more computing devices. (2) The solid model creation stage 104 involves one or more computing devices converting the raw data into a solid model (e.g., converting a point cloud into one or more electronic files formatted according to a standard solid model). (3) The manufacturing program creation stage 106 involves one or more computing devices (which may be the same computing device or devices used in solid model creation stage 104) converting the solid model into a manufacturing program (e.g., a CNC program). The machining stage 108 involves a machining device (e.g., a 3-, 4-, or 5-axis post end machine mill) machining the shim according to the manufacturing program (e.g., from a blank). Various embodiments of these stages will be described below in further detail.

Stage 1—Data Acquisition

According to various embodiments, in a first stage (block 102 of FIG. 1), raw data is acquired that represents the dimensions of the gap between two or more parts that are to be assembled. The data could be acquired in one of several ways, including but not limited to using a capacitance gauge to measure the gap, using an ultrasound system to image the gap, using an X-ray system (such as a computed tomography (CT) X-ray) to image the gap, using a 3D imager (with visible light, such as blue light) to image the gap, or using a predictive shimming approach with a best fit approximation of the gap size. At the conclusion of the data acquisition stage, a point cloud defining the shape of the gap will have been created.

According to one embodiment, the parts to be assembled are brought together as they are expected to be assembled without being permanently fastened. A technician acquires data concerning the dimensions of the gap with the use of a device such as a capacitance gauge, taking a plurality of measurements in the gap at a plurality of locations within the gap.

In an embodiment, the gap measurement device will provide the technician with a reading of the distance between the two pieces (i.e., the gap size) at each XYZ location. The technician would then record that distance, sometimes referred to as the "A measurement" corresponding to the distance of the gap itself, at the corresponding XYZ location. In this regard, the technician may input the measurements directly into a computer program, such as a Microsoft Excel worksheet, or may otherwise record the data for later entry into such a computer program. It also possible to directly input the readings of the gap measurement device into a computer for storage, such as by interfacing the device with a computer or by wirelessly transferring the measurements to the computer. Regardless the data entry method, in the end, the technician will have created a plurality of data points comprising XYZ coordinates with corresponding thickness measurements (i.e., gap measurements) that define the shape of the gap between the parts to be assembled.

According to an embodiment, the capacitance gauge is mounted on an elongated tongue extending from a housing of a handheld device. The capacitance gauge could also be provided with a stiffness adapter in the form of a bracket that is mounted to the housing and provides stiffness to the elongated tongue. The bracket is provided with a sensor, such as a piezo-electric sensor or measuring strip, on an edge of the bracket for detecting a position of the elongated tongue relative to the device housing. For example, when the elongated tongue of the impedance device is intended to remain flat when taking measurements, the bracket and corresponding sensor detects when the elongated tongue is not flat. Data from the bracket and corresponding sensor of the stiffness adaptor allows for the determination of whether the elongated tongue has been pushed out of position.

Figure 2A:
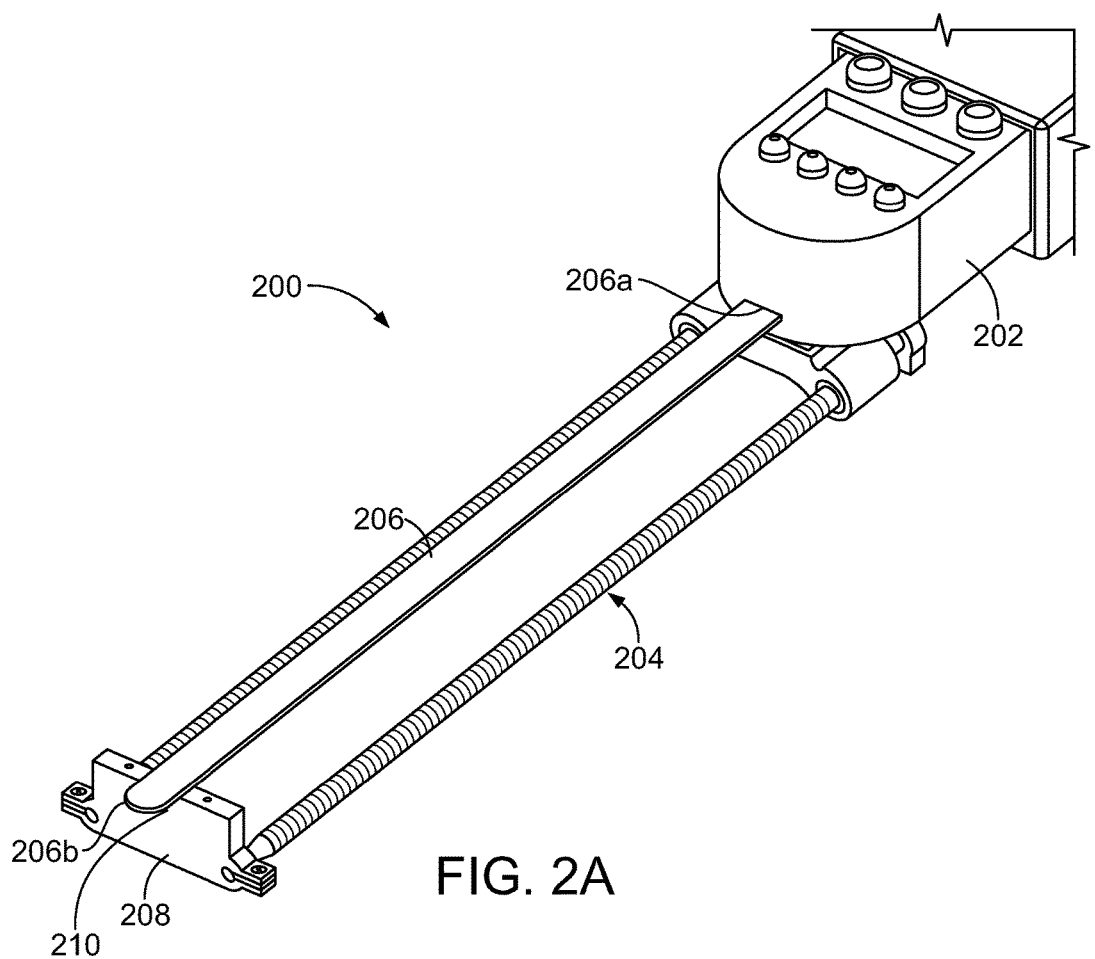
FIG. 2A is a diagram of a capacitive gauge configured according to an embodiment.

Turning to FIG. 2A, an example of a capacitance gauge configured according to an embodiment is shown. The capacitance gauge, generally labeled 200, includes a housing 202, a frame 204 mounted on the housing 202 and extending outwardly therefrom, and a sensor wand 206. The frame 204 includes a pair of support bars, which support a bracket 208. The sensor wand ("wand") 206 extends from the housing 202 at a first end 206a is seated in a notch 210 of the bracket 208. A second end 206b of the sensor wand 206 extends beyond the bracket 208. The sensor wand 206 is formed with a pair of capacitive displacement sensors mounted on opposite sides of a very thin element. The sensors are electrically connected to logic circuitry (not shown) within the housing 202.

To measure a gap between two or more parts using the capacitance gauge 200, the tip 206b of the wand 206 is inserted into the gap. Using the sensors on the wand 206, the capacitance gauge 202 measures capacitances between the wand 206 and each of the surfaces on either side of the gap. Using the relationship between capacitance and distance (with air as the dielectric), the capacitance gauge 200 converts the measured capacitances into a gap measurement. The capacitance gauge 200 is then moved to another location within the gap and a further gap measurement is taken. This process is repeated throughout various locations within the gap.

Figure 2B:
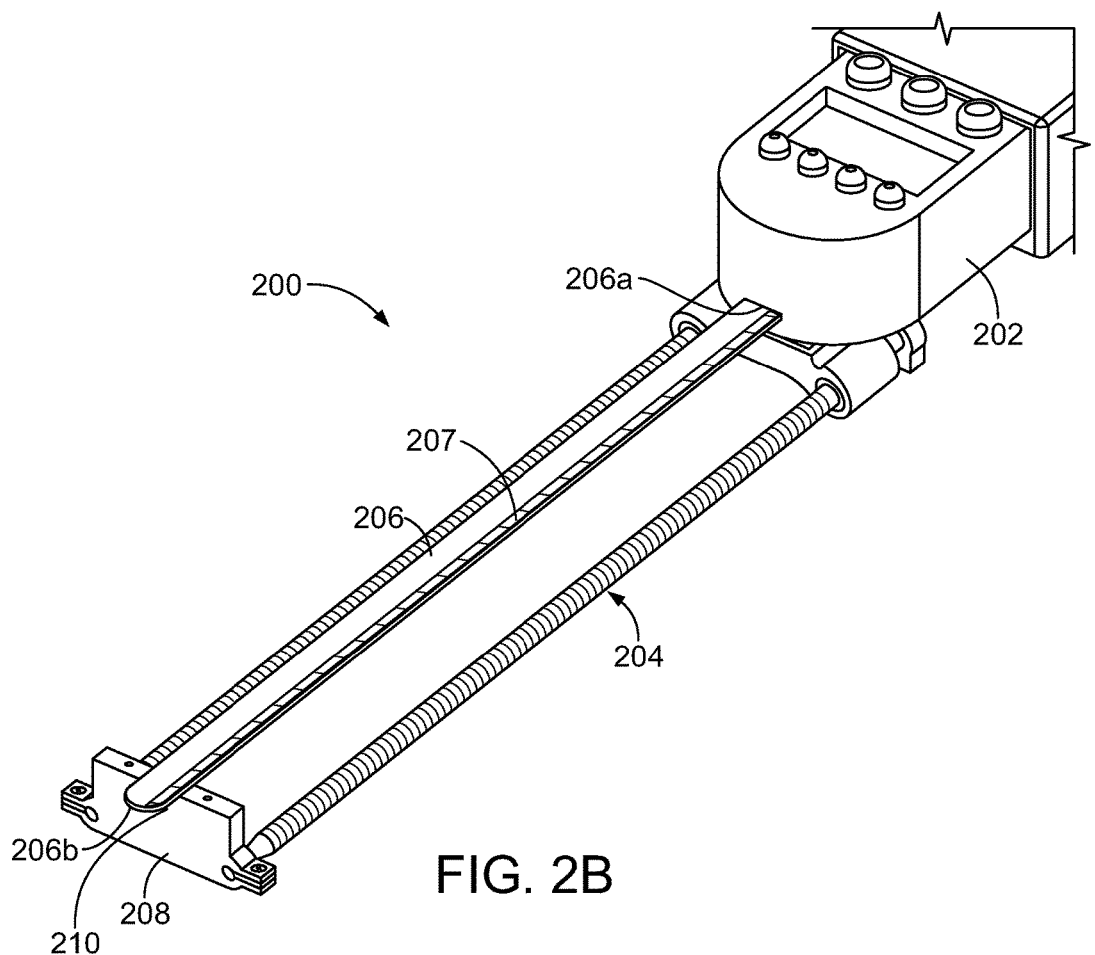
FIG. 2B is a diagram of a capacitive gauge configured according to another embodiment.

As illustrated in FIG. 2B, in an embodiment, the capacitance gauge 200 can be provided with a stiffness sensor 207, such as a piezo-electric sensor or measuring strip, on an edge of the wand 206 for detecting a position of the elongated tongue relative to the device housing. The piezoelectric sensor 207 is communicatively linked to the controller of the capacitive gauge 200, and transmits, to the controller, a signal from the piezo-electric sensor.

According to an embodiment, the gap measurement device is mounted on the end of a robot capable of tracking the location of the gap measurement device. For example, the gap measurement device may be mounted on the arm of a coordinated measuring machine (CMM) that uses software that tracks and records X, Y, and Z movement and creates a 3D point cloud representing the gap. In this implementation, the system would include the gap measurement device, a robot for moving the gap measurement device throughout the gap and tracking the location of the device, and a computer communicatively linked to both the gap measurement device and the robot. The computer records location data of the gap measurement device being output by the robot as a function of time (e.g., data regarding the XYZ coordinates of the gap measurement device at each instant of time) and would similarly record the gap thickness measurements output by the gap measurement device. For example, the computer could create a first point cloud from the positional information being generated by the robot and create a second point cloud from the thickness measurements (i.e., gap measurements) of the gap measurement device. After the acquisition of these sets of data, the gap thickness measurements are synchronized with the location data (e.g., timestamps of the position measurements matched with timestamps of the gap measurements) to associate each particular thickness measurement with the corresponding location measured by the robot. The computer performs this synchronization process.

In an embodiment, after the series of timestamped measurements from the CMM and the gap measurements are received, the following actions are taken: (1) for each gap measurement, the closest timestamped CMM positions before and after the gap measurement are taken; (2) using an inertial movement model, an intermediate position is calculated for the time that the gap measurement was taken; (3) two points in space are then generated: position 1 at the position of the CMM and position 2 is the position of the CMM plus the thickness measurement perpendicular to the orientation of the gap measurement device.

Figure 3:
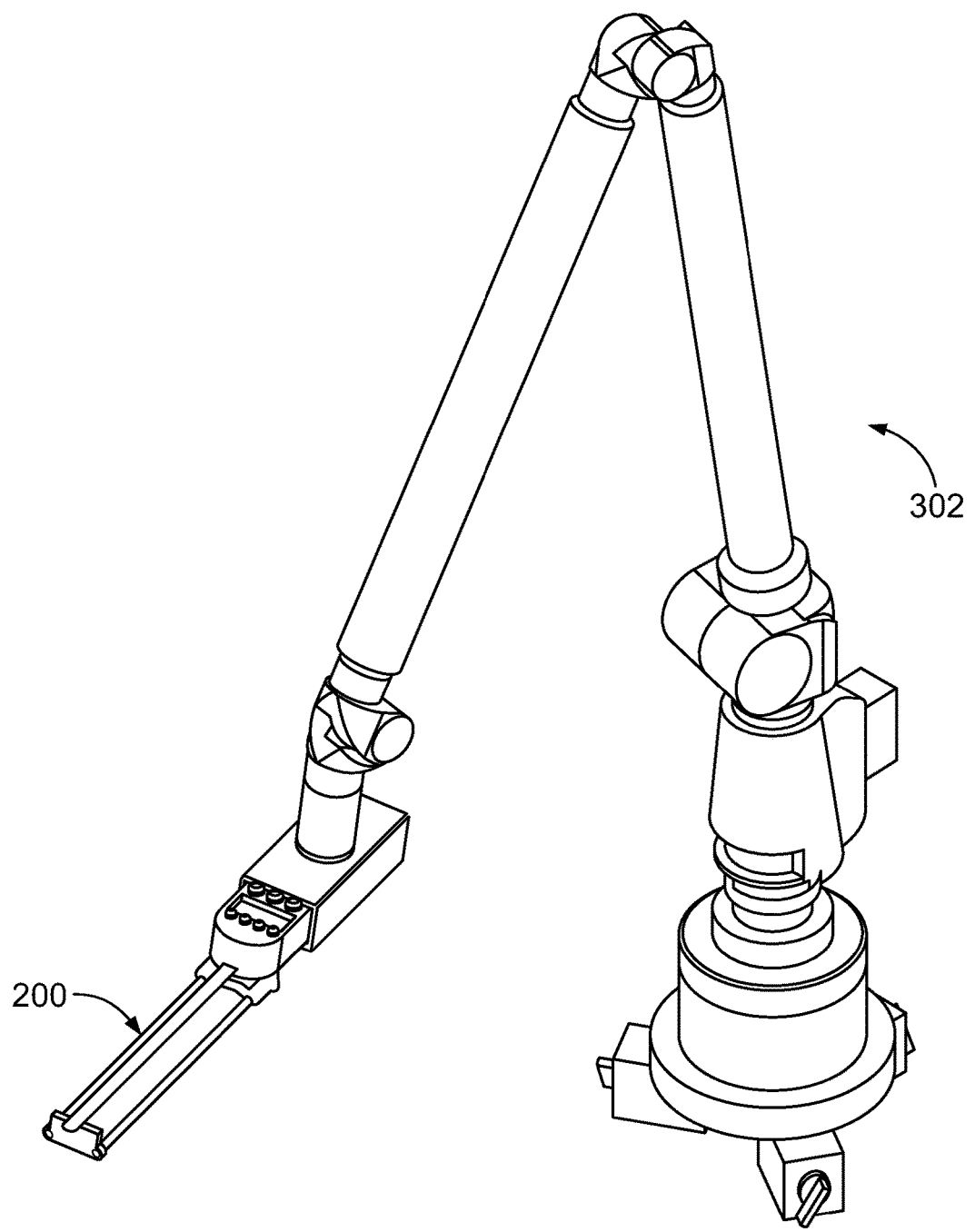
FIG. 3 is a diagram of a robot arm, to which a capacitive gauge is attached, according to an embodiment.

Turning to FIG. 3, an example of the capacitance gauge 202 of FIG. 2 mounted on a robotic arm according to an embodiment is shown. The robotic arm 302 in this embodiment is connected to and controlled by a CMM 304.

In an embodiment, the parts to be assembled are brought together as they are expected to be assembled without being permanently fastened. Thereafter, an imaging device is passed over the gap between the parts to capture image data of the gap. Possible implementations of an imaging device include, but are not limited to, an optical camera imaging device (e.g., a 3D blue light imager), a CT X-ray imaging device, and an ultrasound imaging device. Further, the imaging device could be mounted on a robot capable of tracking the location of the imaging device, such as a CMM (i.e., an imaging device could be used in place of the capacitive device 202 in FIG. 3). The imaging device in this embodiment is connected to a computing device that records the image data output from the imaging device. Programs running on the computing device will analyze the image data acquired by the imaging device to generate a point cloud representing the shape of the gap between the parts.

In an embodiment, if a CT X-ray imaging device is used, an emitter for the CT X-ray imaging device and a receiver for the device are each mounted on a paired robot, the emitter being mounted on one robotic manipulator and the receiver mounted on another robotic manipulator. The CT X-ray imaging device is moved around the pieces and the gap (around the "assembly") through a series of programmed motions that capture the entire hardware envelope in which the gap is located. The CT X-ray imaging device generates an image file by way of this process. The CMM system then uses the image file to create a three dimensional image of the assembly, and autonomous vision recognition software on the CMM system then extracts the gap geometry converts it to a three dimensional point cloud using comparative algorithms. The CMM system may have its own computing device or may share a computing device with one or more other components.

According to an embodiment, instead of measuring the gap between parts directly, gap measurements may be acquired by making a mold of the gap and measuring the mold. For example, a technician could insert a pliable material such as wax, plastic, or resin into the gap (e.g., between the mating surfaces of the assembled components). The pliable material is deformed into a 3D mold of the gap that is then scanned to create the solid model data of the gap.

According to another embodiment, a point cloud corresponding to the gap between the parts to be assembled is modeled in a predictive shimming approach. For example, the three dimensional shape of the mating surface of the first part of the assembly is acquired and the three dimensional shape of the mating surface of the second part of the assembly is separately acquired. Non-limiting examples of how the mating surface information could be acquired include laser scanning the mating surfaces of the two parts or acquiring stereoscopic camera images of the mating surfaces. The mating surface information is acquired in the form of first and second discrete point clouds.

Once the mating surface information has been acquired, the two parts are virtually assembled. The system then artificially simulates the joint by using comparative software to create a best fit simulation of the assembled joint, and then uses comparative software to extract a point cloud of the simulated joint gap. For example, first and second discrete point clouds corresponding to the mating surfaces can be aligned in a projected assembly using computer aided design (CAD) software and best fit algorithms. A comparative algorithm could then be used to extract a third, unique point cloud defined by a negative space between the mating surface first and second point clouds. In addition, deformation of the two parts based upon expected load conditions during assembly could be applied during this best fit approximation. Thereafter, the computer system could determine a point cloud of the negative space between the virtually assembled parts corresponding to the shape of the gap that is to be filled.

Stage 2—Solid Model

After the above described data acquisition stage is completed, the point cloud data representing the shape of the gap is converted into solid model data that could be input into a solid modeling computer program, (e.g., into a file that the Polyworks® family of software can use).

According to an embodiment, a computer program running on a computing device will approximate a solid model of the surfaces represented by the point cloud. For example, a computer program extracts the gap point cloud from the CMM measurement system, orients the gap point cloud, and imports the gap point cloud into another computer program that (a) creates an origin point for reference, and (b) converts the points into a 3D fully-dimensioned solid model. The computer program extracts the 3D solid model, checks for discontinuities in the model against a rule set for what constitutes a solid shim, and automatically redraws any discontinuities. For example, the program may create a polygon mesh of surfaces that closely approximates the data from the point cloud. The computer program also identifies data points that are considered to be outliers, discarding points that depart from the generated mesh of surfaces of the solid model by a distance greater than a predetermined amount from a regression type curve. In addition, the program includes a set of rules to make logical choices to remove points from the point cloud to improve the accuracy of the resulting solid model.

In an embodiment, the generated point cloud data (e.g., generated from the raw gap measurements) is converted, using a 3D computer aided design software into the solid model data using a set of predetermined heuristic rules to fill in surfaces between points in the point cloud using regression filling. Correction algorithms identify and correct discontinuities that are found in the solid model data of the gap based on a regression analysis of the solid model data against a heuristic logic profile to ascertain anomalies against a continuous object with characteristics of a shim. The solid model data is checked automatically by a rule-based comparator for vertices in order to smooth any vertices that are non-discrete so that the solid model data can be loaded into a machining software without creating path creation failures.

Stage 3—Manufacturing Program

After the creation of the solid model from the point cloud data described above, a manufacturing program with instructions for manufacturing a shim is created. In an embodiment, to carry this process out, a computing device imports the clean 3D shim model into an automated comparator (e.g., a computer program) that checks the shim features against a set of shim templates to decide what type of manufacturing program to use to manufacture the shim. The manufacturing program that is ultimately output by the system could be for a CNC machine, a 3D printer, or any other automated manufacturing process.

According to an embodiment, the computing device is provided with a human machine interface (HMI). The HMI will present a user with a series of graphical user interface (GUI) based selections to configure the machine program corresponding to the machine to be used. For example, a user can be presented through the HMI with choices for a machine type (e.g., mill/router, coolant/air, axes limits, etc.), machine tool type, raw material for the shim, fixture setup (table, vice, fixture, etc.), tooling (endmill geometry, coating, feeds and speeds, max engagement, etc.), and available stock sizes for the material (e.g., dimensions, orientation of composite parts, etc.) In addition, the computer program can be preconfigured with a set of rules to make a series of predetermined selections. In this regard, the user need not be presented with a choice of every possible machine type or machine tool type, but rather may be presented only with a predetermined subset of machine types of machine tool types. These predetermined sets of choices can be dictated, for example, by the machines and tools present in a factory, a particular application for which the shim is being created, the specific parts that are to be assembled, the material of the parts being assembled, or some combination of these considerations or other considerations.

According to an embodiment, a computing device downloads the 3D shim model and the appropriate manufacturing template. The manufacturing template decides things like raw material stock selection, manufacturing tools, tooling and mounting, and manufacturing machine type. The computing device downloads the 3D shim model is into a CAM software package that uses the selected template and geometry to generate the manufacturing G-Code programming needed to manufacture the part.

According to an embodiment, a computing device extracts the completed G-code program and accompanying template information and downloads the completed G-code program and template information to an automated fabrication machine. The fabrication machine could be one of at least a machine mill and a 3D printer.

According to an embodiment, a machine mill is provided that matches the G-code program loaded with the corresponding tooling called out per template. The machine mill could be loaded with the appropriate shim blank either manually by a technician or by a robotic manipulator, which also receives its instructions regarding which shim blank to load from the software system based upon the selected template. For example, a robotic manipulator or a technician first loads the shim blank into the appropriate tooling fixture. Then, a robotic manipulator or a technician loads the tooling fixture in the appropriate machine specified by the template of the manufacturing program.

According to an embodiment, a 3D printer is provided. The 3D printer is loaded with the appropriate manufacturing material by a technician in accordance with the manufacturing program and specified template. A tooling blank for printing on by a robotic manipulator is loaded in accordance with the manufacturing program and selected template.

In an embodiment, a manufacturing program will be automatically created specific to the machine selected by either the user or by the program itself. Template (*.machine) programming files will be included with the program. These templates will specify the necessary syntax, structure and units such that the independent code which is generated by the program can be transpiled (converted from one source code to another source code) into the syntactically correct version for the specified machine. The template file will also include the allowed methods of manufacturing, which are specific to each machine. For example, a high speed router will be able to utilize high speed machining toolpaths whereas a 3D printer might be able to deposit up to certain filament diameters and have limited support for rapid accelerations and decelerations necessary for a better surface smoothness and continuity.

According to an embodiment, the type of material, size and geometry of shim and type of machine being used will determine which manufacturing template is selected. The template is a series is a subset of options available to the manufacturing software to determine how best to manufacture the shim. For example, given a material selection of aluminum, and assuming a low horsepower machine a smaller diameter, 2-3 flute cutting tool would be selected. If a part is wider than 6", a vacuum table will be selected with tabs for holding added to the part itself.

Stage 4—Machining

After the machine program is generated, the shim is manufactured according to that machine program. According to an embodiment, the machine operator is instructed via the HMI regarding which machine, machine tool, blank part, etc. to use for the specified program. The machine is then to be configured accordingly before the machine program is executed on the machine to manufacture the shim.

The manufacturing machine, once loaded with raw stock and tooling in accordance with the software instructions provided by the manufacturing program, is then initiated by the control software to begin manufacturing the actual shim. Once manufacturing is complete, the finished shim on its mounting tooling is removed from the manufacturing equipment, and the next tooling fixture is automatically loaded in accordance with the software control system.

In an embodiment, after the manufacturing instructions are generated and assigned to a machine a series of events will occur: (1) The operator will receive a setup document explaining things such as material used, position, fixturing and tooling. (2) The machine code will be either directly transmitted to the machine or a location to copy machine code from will be provided in the setup sheet (see step 1). In cases of manual manufacture, detailed instructions for manufacture will instead be added to (1). (3) The operator will setup the machine according to the setup instructions (1) and manufacture the part. After successful completion, the operator will notify the planning software that the work is completed, freeing the machine up for the next assignment. (4) The machine code will then be archived according to storage requirements and removed from the machine.

According to an embodiment, in large facilities with multiple pieces of equipment that can be used to support the manufacture of parts, a master controller can be used to manage and delegate work amongst the pieces of manufacturing equipment. After the manufacturing process for a shim is generated (along with setup and cycle time calculations) it is put into a dynamic work queue specific to a piece of equipment designed to optimize for maximum utilization and on-time delivery of parts. Users or machines, upon completion of a work item, notify the system of the status of an order and the health of a machine. Each time an external event occurs (work complete, work stoppage, waiting on material, labor shortage, etc. . . . ) the queue is updated and work redistributed with the potential that the manufacturing process is regenerated is work is moved to a new machine.

Various Detailed Methods

Figure 4:
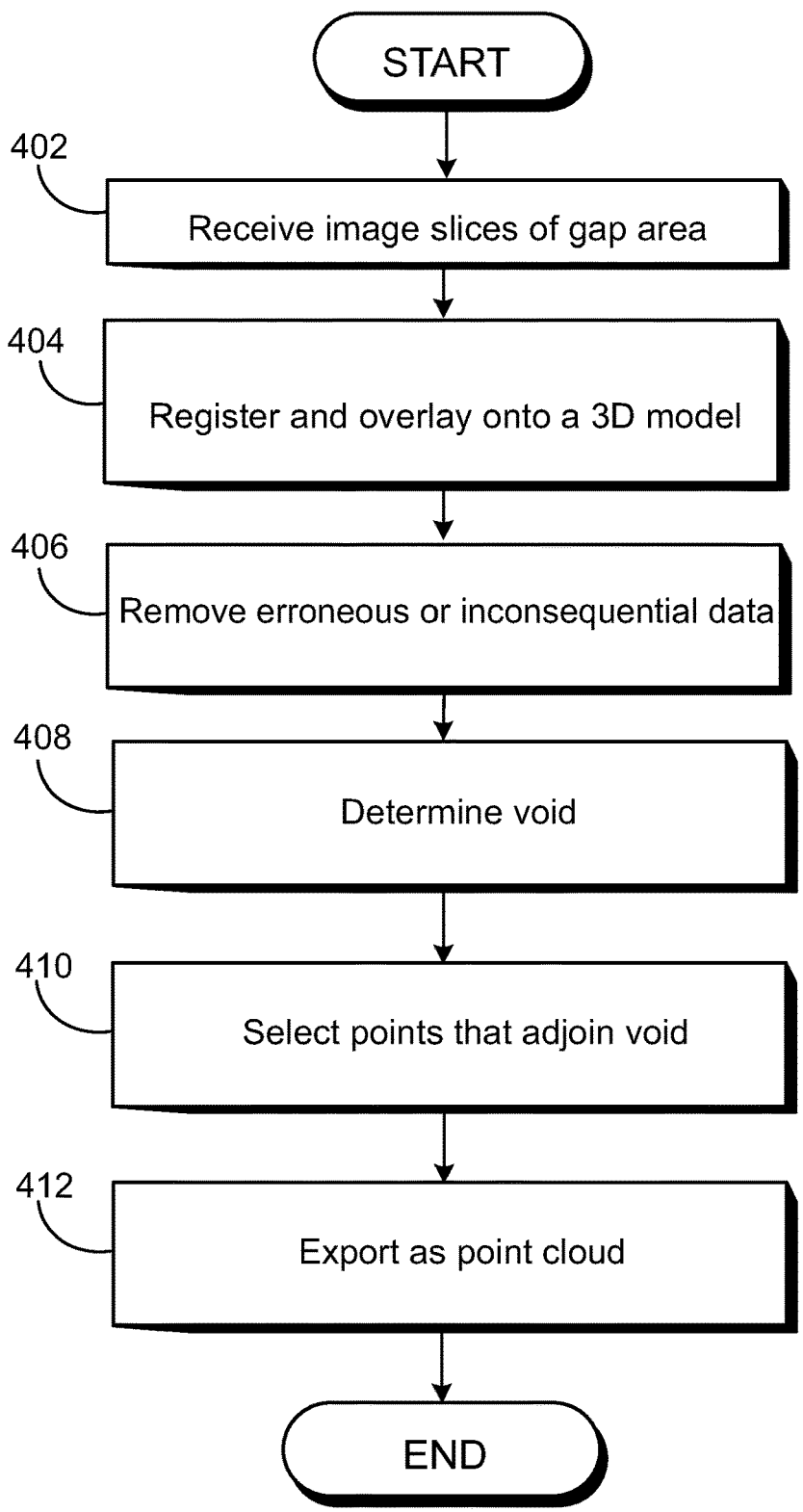
FIG. 4 is a flow chart of a process carried out to generate a map of a gap between adjacent parts, according to an embodiment.

Turning to FIG. 4, a process carried out (e.g., by a computing device) to generate a map of a gap between adjacent parts according to an embodiment will now be described. In this embodiment, a CT scanner is used to take images of the gap. At block 402, image slices of the area of the gap from the CT scanner are received. At block 404, the images slices are registered and overlaid onto a 3D model. At block 406, binary thresholding and intelligent segmentation (e.g., random sample consensus (RANSAC)) is applied to remove erroneous or inconsequential data. At block 408, a void is determined. At block 410, all adjoining points to the void are selected. At block 412, the points of the void and the adjoining points are exported as a point cloud.

Figure 5:
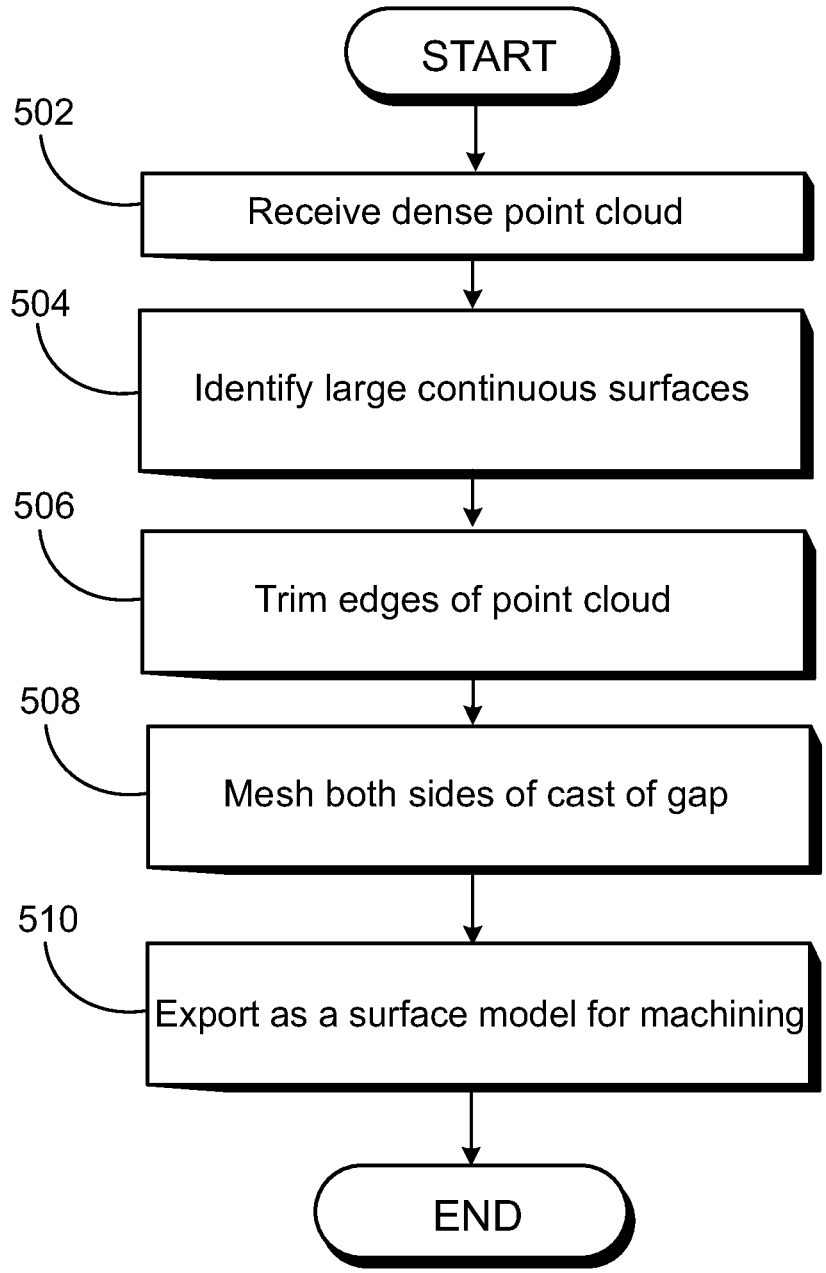
FIG. 5 is a flow chart of a process carried out to generate a map of a gap between adjacent parts, according to another embodiment.

Turning to FIG. 5, a process carried out (e.g., by a computing device) to generate a map of a gap between adjacent parts according another embodiment will now be described. In this embodiment, a 3D scanner (e.g., a scanner that uses blue light technology) is used to take images of the gap. At block 502, a dense point cloud is received from the 3D scanner. At block 504, RANSAC is applied to identify large continuous surfaces. At block 506, edges of the point cloud are trimmed. At block 508, a 3D cast is made of the gap (e.g., using one of the previously-described techniques) and both sides of the cast are meshed. At block 510, a surface model of the gap is generated and exported (for machining).

Figure 6:
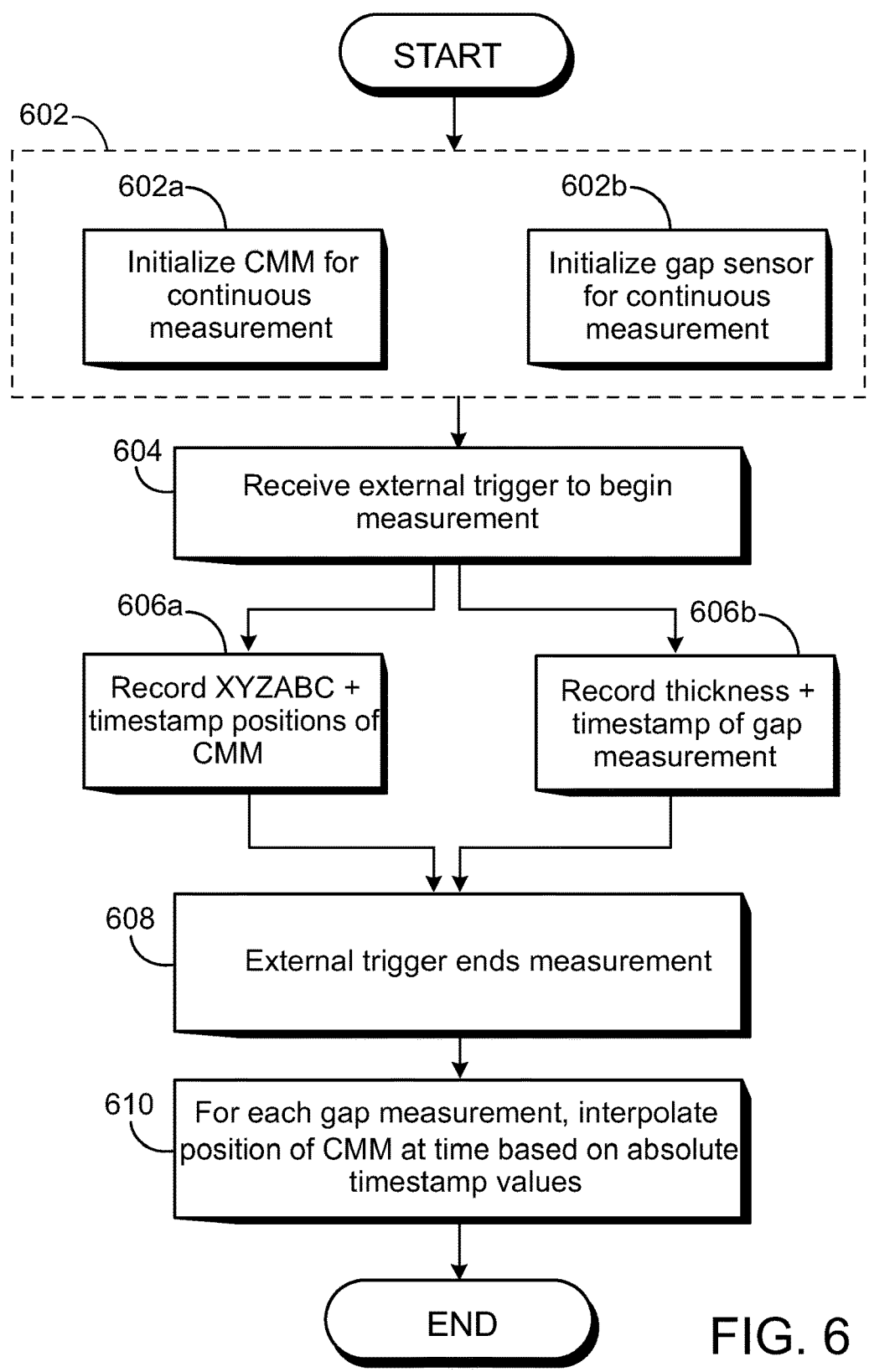
FIG. 6 is flow chart of a process carried out to generate a map of a gap between adjacent parts, according to still another embodiment.

Turning to FIG. 6, a process carried out (e.g., by a computing device) to measure a gap between adjacent parts according to still another embodiment will now be described. In this embodiment, the gap measurements (e.g., taken by a capacitive gauge) are synchronized with positional measurements (e.g., position as measured by a CMM controlling an arm to which the capacitive gauge is attached). It is to be noted that each of these steps may be performed by a single computing device. At block 602, the CMM and the gap measurement device (e.g., a capacitive gauge) are initialized for continuous measurement (sub-blocks 602a and 602b respectively). At block 604, an external trigger to begin measurement is provided to both the CMM and the gap measurement device. Both the CMM and the thickness sensor continuously take measurements.

At block 606a, the coordinates (e.g., XYZABC coordinates) are received from the CMM and are recorded along with their timestamps. In parallel with block 606a, gap measurements received from the gap measurement device are also recorded along with their timestamps (block 606b). At block 608, an external trigger to end measurement is provided to both the CMM and the gap measurement device. At block 610, for each gap measurement, the position of the CMM at the timestamp closest to the timestamp of the gap measurement is interpolated (if necessary) based on absolute timestamp values.

Figure 7:
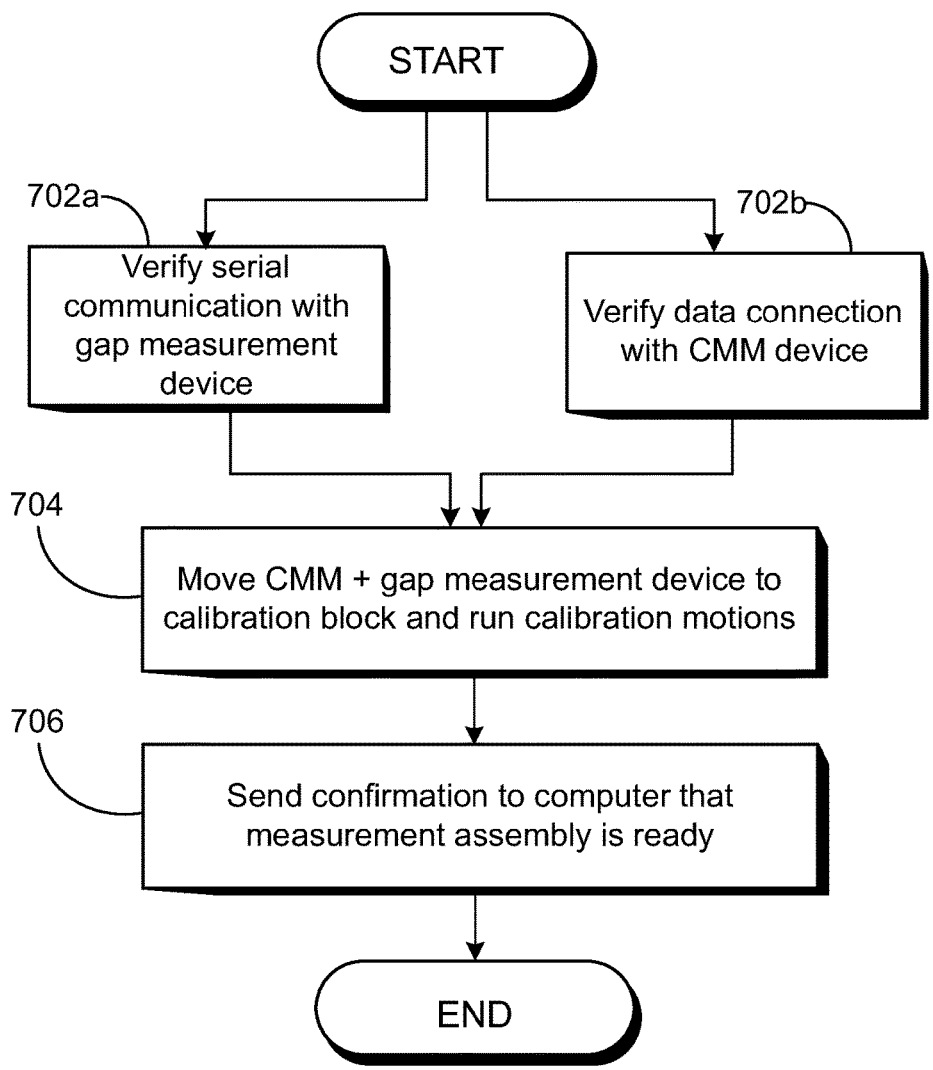
FIG. 7 an example of the initialization process, according to an embodiment.

Turning to FIG. 7, an example of the initialization process of block 602 (of FIG. 6) according to an embodiment will now be described. This process may be carried out by a computing device (such as the computing device issuing commands to the CMM and to the gap measurement device to carry out parts of the process). At block 702a, serial communication with the gap measurement device is verified. At block 702b, data connection with the CMM is verified. At block 704, the arm of the CMM (e.g., carrying the gap measurement device) is moved in accordance with a calibration routine. At block 706, the gap measurement device sends confirmation (e.g., to the computing device) that the gap measurement device is ready.

Figure 8:
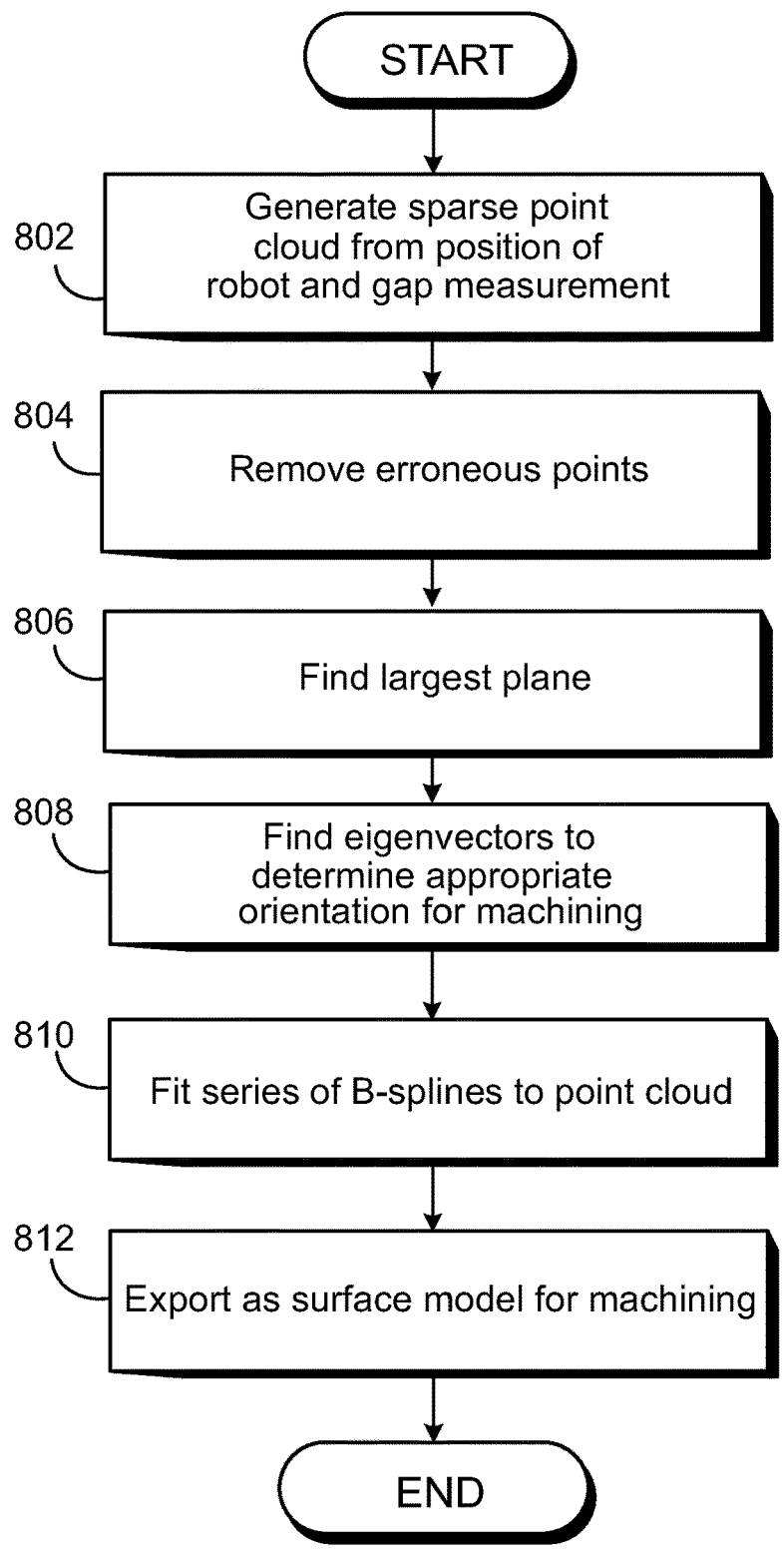
FIG. 8 is an example of a process carried out to generate a surface model according to an embodiment.

Turning to FIG. 8, a process carried out (e.g., by a computing device) to generate a surface model (e.g., following the process of FIG. 6) according to an embodiment will now be described. Each of these steps may be performed by a computing device. At block 802, a sparse point cloud is generated from the position (e.g., along the gap) of a robot arm along with a thickness measurement (e.g., a gap thickness measurement) received from the gap measurement device (e.g., the capacitive gauge 202 of FIG. 3). At block 804, a robust RANSAC algorithm is applied to the sparse point cloud to remove erroneous points. At block 806, a robust RANSAC algorithm is applied in order to find the largest plane. At block 808, points on the plane are taken and eigenvectors are found in order to determine the appropriate orientation of the piece to be machined into a shim. At block 810, a series of B-splines are fit to the point cloud. At block 812, the data is exported as a surface model for machining.

Figure 9:
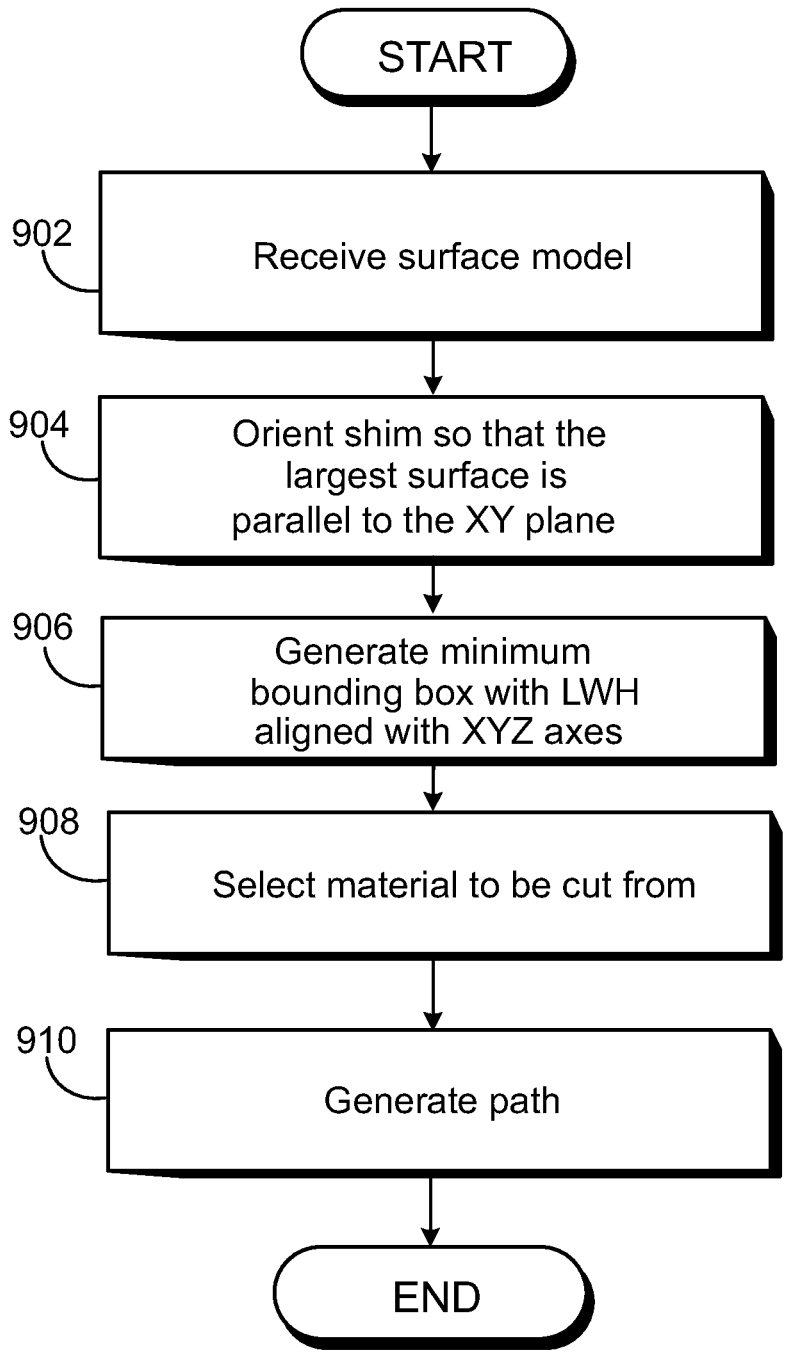
FIG. 9 is an example of a process carried out to create a manufacturing program according to an embodiment.

Turning to FIG. 9, a process carried out to create a manufacturing program according to an embodiment will now be described. At block 902, a surface model is received from a prior measurement and processing step. At block 904, the generated shim is oriented with the largest surface so that it is parallel with the XY plane. At block 906, a minimum bounding box is generated with length-width-height (LWH) aligned with the XYZ axes. At block 908, material to be cut from is then selected based on the next nearest size and the fixturing abilities of available machines. At block 910, a path is generated based on material, machine type, and tooling selected based on manufacturing presets.

System

According to an embodiment, the overall automated shim fabrication system is controlled with a master and slave configuration where the overarching master system tracks the current state of each process subsystem described above. Based on the current state of each process subsystem, the master system determines timing for initiation of the next part of the operation. The operator of the system is responsible to set up the measurement equipment and operating the equipment in cases where the equipment operation is manual, programming the equipment where the movements are robotic, and positioning the equipment where it is positioned without movement. An operator also loads the raw material into the manufacturing machines or into their loading positions, cleans and prepares tooling, and removes finished products from the machine and resets the tooling for the next cycle.

According to an embodiment, a system for automated shim manufacturing includes a computer system that is connected to a gap measurement device and a machine for manufacturing the shim. The computer system may be connected to the gap measurement device and the machine by way of cables, such as Ethernet, USB, or any other suitable connection type, as well as by way of wireless connection. In addition, the computer system, gap measurement device, and machine may be connected by means of a network.

Figure 10:
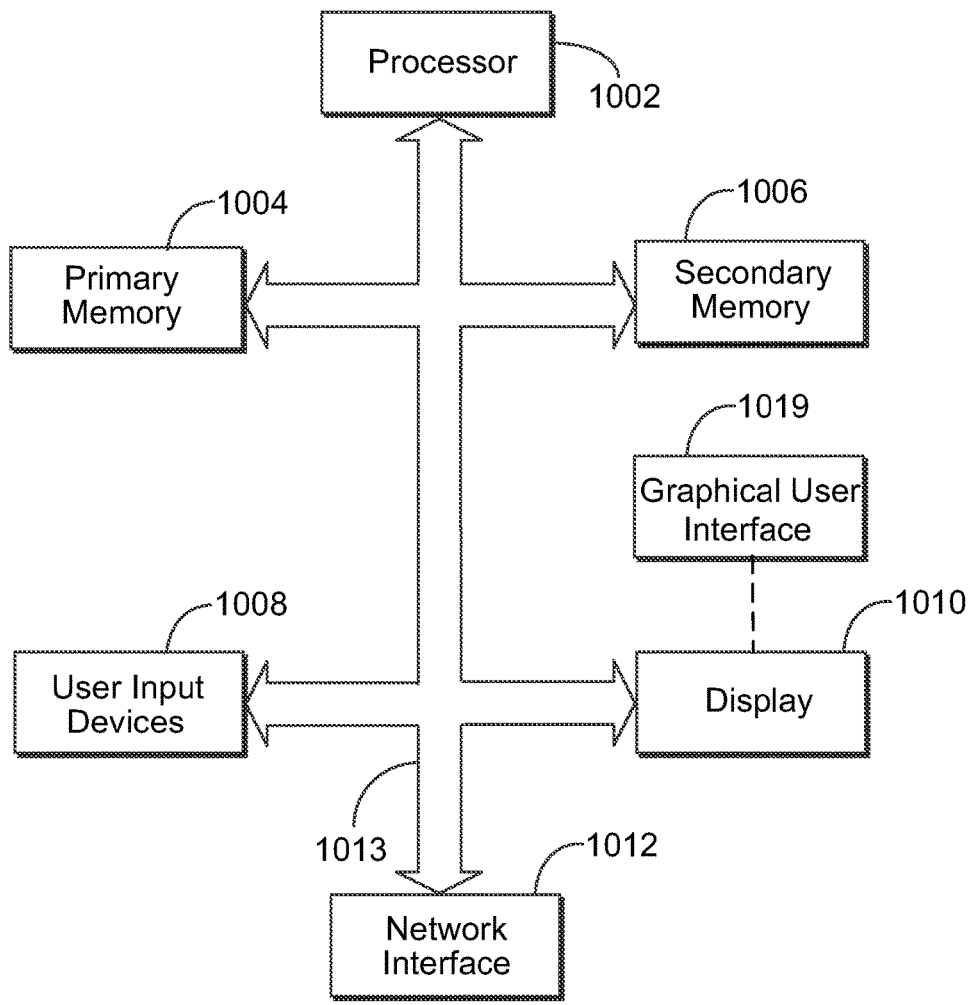
FIG. 10 is an illustration of a general architecture of a computing device, according to an embodiment.

In the various embodiments described herein, many of the methods or steps thereof are implemented using a computing device. Examples of a computing device include a computer (e.g., server, desktop, or notebook). In one implementation, a computing device has the general architecture shown in FIG. 10. The computing device 1000 includes processor hardware 1002 (e.g., a microprocessor, controller, or application-specific integrated circuit) (hereinafter "processor 1002"), a primary memory 1004 (e.g., volatile memory, random-access memory), a secondary memory 1006 (e.g., non-volatile memory), user input devices 1008 (e.g., a keyboard, mouse, or touchscreen), a display device 1010 (e.g., an organic, light-emitting diode display), and a network interface 1012 (which may be wired or wireless). Each of the elements of FIG. 10 is communicatively linked to one or more other elements via one or more data pathways 1013. Possible implementations of the data pathways 1013 include wires, conductive pathways on a microchip, and wireless connections. In an embodiment, the processor 1002 is one of multiple processors in the computing device, each of which is capable of executing a separate thread. In an embodiment, the processor 1002 communicates with other processors external to the computing device in order to initiate the execution of different threads on those other processors.

The memories 1004 and 1006 store instructions executable by the processor 1002 and data. The term "local memory" as used herein refers to one or both the memories 1004 and 1006 (i.e., memory accessible by the processor 202 within the computing device). The processor 1002 executes the instructions and uses the data to carry out various procedures including, in some embodiments, the methods described herein, including displaying a graphical user interface 1019. The graphical user interface 1019 is, according to one embodiment, software that the processor 1002 executes to display a template on the display device 1010, and which permits a user to make inputs into the template via the user input devices 1008.

Methods described herein may be stored in the form of computer executable instructions on a non-volatile computer-readable medium. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The use of the terms "a" and "an" and "the" and similar referents in the context herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. An autonomous shim fabrication system, comprising:
a gap data acquisition device that acquires gap data for a gap between mating surfaces of components that are to be assembled, the gap data acquisition device comprising:
a capacitance gauge that acquires gap measurements, a stiffness sensor proximate to the capacitance gauge, wherein the stiffness sensor generates signals based on a displacement of the capacitance gauge, and a controller that determines, based on the generated signals, whether the capacitance gauge is out of position;

a gap data conversion system that converts the gap data into three dimensional computer solid model data of the gap;

a solid model data correction system that corrects the solid model data to generate corrected solid model data of the gap; and a solid model data conversion system that converts the corrected solid model data into a manufacturing sequence that, when executed by a computer communicatively coupled to a manufacturing machine, controls the manufacturing machine to manufacture a shim corresponding to the gap.

2. The autonomous shim fabrication system of claim 1, wherein the gap data acquisition device comprises an impedance device with a coordinated measuring machine that records a position of the impedance device.

3. The autonomous shim fabrication system of claim 2, wherein the gap data acquisition device synchronizes a time of measurement of the gap data to the position of the impedance device acquired by the coordinated measuring machine, and then meshes the gap data and the position of the impedance device to create a three dimensional point cloud representation of the gap.

4. The autonomous shim fabrication system of claim 3, wherein the impedance device comprises:
an elongated member extending from a housing;
a capacitance sensor on the elongated member; and
a bracket mounted to the housing, wherein the bracket includes a sensor on an edge of the bracket that detects a position of the elongated member relative to the housing.

5. The autonomous shim fabrication system of claim 1, wherein the gap data acquisition device comprises a CT X-ray device that creates a CT image and is mounted to a paired set of robotic manipulators comprising a first robotic manipulator holding a CT X-ray emitter and a second robotic manipulator holding a CT X-ray receiver, and
the gap data acquisition device processes the CT image to create an image file that can be image analyzed to extract the gap data using comparative algorithms.

6. The autonomous shim fabrication system of claim 1, wherein the gap data acquisition device comprises a three dimensional stereoscopic computer vision device that first acquires three dimensional surface data of the mating surfaces as first and second point clouds, and the gap data acquisition device then uses software comprising best fit algorithms to align the first and second point clouds in a projected assembly and then uses a comparative algorithm to extract the gap data creating a third point cloud based on a negative space between the first and second point clouds.

7. The autonomous shim fabrication system of claim 1, wherein the gap data is in the form of a three dimensional point cloud.

8. The autonomous shim fabrication system of claim 7, wherein the point cloud data corresponding to the gap data is converted using a three dimensional computer aided design software into the solid model data using a set of predetermined heuristic rules to fill in surfaces between points in the point cloud using regression filling.

9. The autonomous shim fabrication system of claim 7, wherein correction algorithms identify and correct discontinuities that are found in the solid model data of the gap based on a regression analysis of the solid model data against a heuristic logic profile to ascertain anomalies against a continuous object with characteristics of a shim.

10. The autonomous shim fabrication system of claim 8, wherein the solid model data is checked automatically by a rule-based comparator for vertices in order to smooth any vertices that are non-discrete so that the solid model data can be loaded into a machining software without creating path creation failures.

11. The autonomous shim fabrication system of claim 1, wherein the solid model data conversion system imports the corrected solid model data into a rule-based comparator that assigns the corrected solid model data to a manufacturing template based on geometry features of the corrected solid model data, the manufacturing template having a predetermined number of manufacturing conditions, and wherein the manufacturing sequence is based on the manufacturing template.

12. The autonomous shim fabrication system of claim 11, wherein the solid model data conversion system uses a Human Machine Interface (HMI) to analyze geometry of the solid model data and to generate a set of simplified choice menus from a pre-generated list allowing an operator to select prerequisite data on a shim type so manufacturing algorithms can then use the operator selections and the geometry of the solid model data to create the manufacturing sequence including movement commands, tool choice, and material parameters.

13. The autonomous shim fabrication system of claim 11, wherein the solid model data conversion system extracts manufacturing parameters, pairs the manufacturing parameters with the manufacturing template to create a paired manufacturing sequence, and pushes the paired manufacturing sequence to the manufacturing machine.

14. The autonomous shim fabrication system of claim 1, wherein the solid model data conversion system comprises:
a human machine interface that presents a user with a series of graphical user interface based selections to configure the manufacturing sequence corresponding to the manufacturing machine to be used to manufacture the shim.

15. The autonomous shim fabrication system of claim 14, wherein the human machine interface presents the user with choices for a manufacturing machine type, a manufacturing machine tool type, and a raw material for the shim.

16. The autonomous shim fabrication system of claim 15, wherein the solid model data conversion system is preconfigured with a set of rules to make a series of predetermined selections for the manufacturing machine type, the manufacturing machine tool type, or the raw material for the shim.

17. The autonomous shim fabrication system of claim 1, comprising:
robotic manipulators that load tooling and raw material into the manufacturing machine in accordance with the manufacturing sequence.

18. The autonomous shim fabrication system of claim 17, wherein the robotic manipulators comprise end effectors that manipulate the tooling and raw material in accordance with the manufacturing sequence.

19. The autonomous shim fabrication system of claim 18, wherein the manufacturing sequence comprises:
holding a shim blank with edge clamps;
machining a first side of the shim blank;
flipping the shim blank;
machining a second side of the shim blank to finish the shim; and extracting the finished shim.

20. The autonomous shim fabrication system of claim 1, wherein the manufacturing machine comprises a machining mill for reductive manufacturing of the shim from a composite shim blank or a metallic shim blank in accordance with the manufacturing sequence.

21. The autonomous shim fabrication system of claim 1, wherein the manufacturing machine comprises a printer for additive manufacturing of the shim from a composite shim feed stock or a metallic shim feed stock in accordance with the manufacturing sequence.

22. The autonomous shim fabrication system of claim 1, wherein the manufacturing machine comprises a shim removal device that removes the shim in accordance with the manufacturing sequence.

23. The autonomous shim fabrication system of claim 1, wherein the manufacturing machine comprises a cleaning system that prepares the tooling for reuse in accordance with the manufacturing sequence.

24. The autonomous shim fabrication system of claim 1, comprising:
a master monitoring device that monitors a current operation state of each of the gap data acquisition device, the gap data conversion system, the solid model data correction system, and the solid model data conversion system,
wherein the master monitoring device controls the gap data acquisition device, the gap data conversion system, the solid model data correction system, and the solid model data conversion system based on each respective current operation state.

25. The autonomous shim fabrication system of claim 1, wherein the manufacturing machine is configured to finish, clean, paint, mark, inspect, or package the shim in accordance with the manufacturing sequence.

26. The autonomous shim fabrication system of claim 1, wherein the gap data acquisition device comprises a pliable material placed in the gap between the mating surfaces of the assembled components, wherein the pliable material is deformed into a mold of the gap that is then scanned into the solid model data of the gap.

27. A method of autonomously manufacturing a shim, comprising:
acquiring, from a gap data acquisition device, gap data for a gap between mating surfaces of components that are to be assembled, the gap data acquisition device comprising:
a capacitance gauge that acquires gap measurements,
a stiffness sensor proximate to the capacitance gauge, wherein the stiffness sensor generates signals based on a displacement of the capacitance gauge, and
a controller that determines, based on the generated signals, whether the capacitance gauge is out of position;
converting the gap data into three dimensional computer solid model data of the gap;
correcting the solid model data to generate corrected solid model data of the gap;
converting the corrected solid model data into a manufacturing sequence; and
controlling a manufacturing machine to manufacture a shim corresponding to the gap based on the manufacturing sequence when the manufacturing sequence is executed by a computer communicatively coupled to the manufacturing machine.

28. A tangible, non-transitory computer readable medium, storing machine readable instructions that, when executed by one or more processors, cause the one or more processors to:
acquire, from a gap data acquisition device, gap data for a gap between mating surfaces of components that are to be assembled, the gap data acquisition device comprising:
a capacitance gauge that acquires gap measurements,
a stiffness sensor proximate to the capacitance gauge, wherein the stiffness sensor generates signals based on a displacement of the capacitance gauge, and
a controller that determines, based on the generated signals, whether the capacitance gauge is out of position;
convert the gap data into three dimensional computer solid model data of the gap;
correct the solid model data to generate corrected solid model data of the gap;
convert the corrected solid model data into a manufacturing sequence; and
control a manufacturing machine to manufacture a shim corresponding to the gap based on the manufacturing sequence.

* * * * *